United States Patent
Hitotsumatsu

(10) Patent No.: US 12,115,933 B2
(45) Date of Patent: Oct. 15, 2024

(54) AUTHENTICATION SYSTEM, AUTHENTICATION METHOD AND NON-TRANSITORY COMPUTER READABLE STORAGE MEDIUM

(71) Applicant: DENSO CORPORATION, Kariya (JP)

(72) Inventor: Takafumi Hitotsumatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 18/173,252

(22) Filed: Feb. 23, 2023

(65) Prior Publication Data

US 2023/0192031 A1 Jun. 22, 2023

Related U.S. Application Data

(63) Continuation of application No. PCT/JP2021/032039, filed on Sep. 1, 2021.

(30) Foreign Application Priority Data

Oct. 1, 2020 (JP) .................... 2020-167086

(51) Int. Cl.
    *B60R 25/24* (2013.01)
    *G07C 9/00* (2020.01)

(52) U.S. Cl.
    CPC .......... *B60R 25/24* (2013.01); *G07C 9/00309* (2013.01); *B60R 2325/101* (2013.01); *B60R 2325/205* (2013.01); *G07C 2009/00793* (2013.01); *G07C 2209/63* (2013.01)

(58) Field of Classification Search
    CPC ............. B60R 25/24; B60R 2325/101; B60R 2325/205; G07C 9/00309; G07C 2009/00793; G07C 2209/63
    See application file for complete search history.

(56) References Cited

U.S. PATENT DOCUMENTS

2008/0305771 A1* 12/2008 Yajima ................ H04M 1/66
455/411
2013/0272714 A1* 10/2013 Ohkubo ............... G08C 23/04
340/5.6

(Continued)

FOREIGN PATENT DOCUMENTS

| JP | 2005192206 A | 7/2005 |
| JP | 2007036693 A | 2/2007 |

(Continued)

*Primary Examiner* — Thomas D Alunkal
(74) *Attorney, Agent, or Firm* — Harness, Dickey & Pierce, P.L.C.

(57) ABSTRACT

An authentication control includes a connection authentication and an operation authentication for an authentication target device using a mobile terminal and a communication device that receives a signal from the mobile terminal toward the authentication target device. Information received by a reception unit in the mobile terminal and information detected by a state sensor for detecting a state of the mobile terminal are acquired. A connection response signal is transmitted from a transmission unit in the mobile terminal when the state of the mobile terminal satisfies a permission condition. A state determination for determining the state of the mobile terminal is performed after the reception unit receives the connection request signal.

10 Claims, 8 Drawing Sheets

(56) References Cited

U.S. PATENT DOCUMENTS

| | | | | |
|---|---|---|---|---|
| 2015/0349917 A1* | 12/2015 | Skaaksrud | ............ | H04W 52/40 |
| | | | | 370/328 |
| 2016/0270002 A1* | 9/2016 | Kawagishi | ............ | H04M 19/04 |
| 2017/0230358 A1* | 8/2017 | Hamasaki | ............. | H04M 1/673 |
| 2019/0394209 A1* | 12/2019 | Urabe | ........................ | G01S 5/12 |
| 2020/0406860 A1* | 12/2020 | Mai | ........................ | B60R 25/31 |

FOREIGN PATENT DOCUMENTS

| | | |
|---|---|---|
| JP | 4737448 B2 | 8/2011 |
| JP | 2013217142 A | 10/2013 |
| JP | 2014153889 A | 8/2014 |
| JP | 2015093556 A | 5/2015 |
| JP | 6576980 B2 | 9/2019 |

\* cited by examiner

AUTHENTICATION SYSTEM, AUTHENTICATION METHOD AND NON-TRANSITORY COMPUTER READABLE STORAGE MEDIUM

CROSS REFERENCE TO RELATED APPLICATIONS

The present application is a continuation application of International Patent Application No. PCT/JP2021/032039 filed on Sep. 1, 2021, which designated the U.S. and claims the benefit of priority from Japanese Patent Application No. 2020-167086 filed on Oct. 1, 2020. The entire disclosures of all of the above applications are incorporated herein by reference.

TECHNICAL FIELD

The disclosure in this specification relates to an authentication system, an authentication method, and a non-transitory computer readable storage medium.

BACKGROUND

JP-2013-217142-A discloses a state control system and a state control method for controlling a lock state of a controlled object based on a signal transmitted by a mobile terminal. The disclosure of JP-2013-217142-A is incorporated herein by reference as an explanation of technical elements in the present disclosure.

SUMMARY

According to an example, an authentication control may include a connection authentication and an operation authentication for an authentication target device using a mobile terminal and a communication device that receives a signal from the mobile terminal toward the authentication target device. Information received by a reception unit in the mobile terminal and information detected by a state sensor for detecting a state of the mobile terminal are acquired. A connection response signal is transmitted from a transmission unit in the mobile terminal when the state of the mobile terminal satisfies a permission condition. A state determination for determining the state of the mobile terminal is performed after the reception unit receives the connection request signal.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
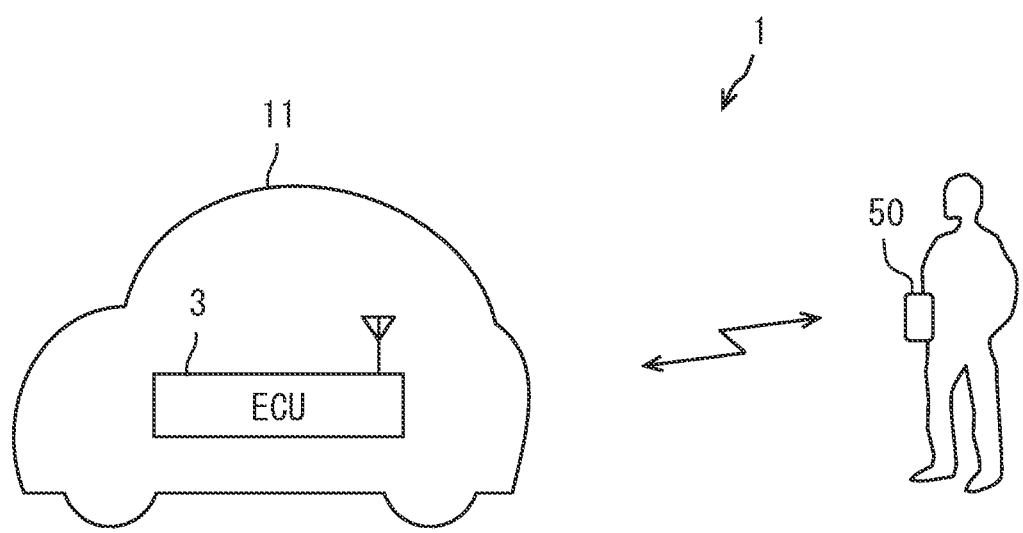
FIG. 1 is a configuration diagram showing the configuration of an authentication system.

In the configuration of the prior art document, after detecting that the user of the mobile terminal is stationary, that is, not walking, various processes are performed to control the lock state. Here, the portable terminal consumes power each time it detects whether the user is walking. In the above-mentioned viewpoints or in other viewpoints not mentioned, further improvements are required in the authentication system.

Example embodiments provide an authentication system or the like capable of reducing power consumption related to authentication control.

The authentication system performs an authentication control including a connection authentication for establishing a communication connection and an operation authentication for operating an authentication target device as a target whether or not operation by a user possessing a mobile terminal is permitted. The authentication system includes a communication device that receives a signal transmitted from the mobile terminal toward the authentication target device.

The mobile terminal includes:
a state sensor that performs a short-range wireless communication, and detects a state of the mobile terminal;
a reception unit that receives a connection request signal for requesting a communication connection;
a transmission unit that transmits a connection response signal to be transmitted in response to the connection request signal; and
a control unit that controls the short-range wireless communication.

The control unit includes:
an acquisition unit that acquires information received by the reception unit and information detected by the state sensor;
a determination unit that performs a state determination for determining the state of the mobile terminal based on the information acquired by the acquisition unit; and
an execution unit that transmits the connection response signal from the transmission unit when the state of the mobile terminal satisfies a permission condition, and does not transmit the connection response signal from the transmission unit when the state of the mobile terminal does not satisfy the permission condition.

The determination unit does not perform the state determination before the reception unit receives the connection request signal, and performs the state determination after the reception unit receives the connection request signal.

Further, a authentication method for performing an authentication control including a connection authentication for establishing a communication connection and an operation authentication for operating an authentication target device using a mobile terminal executable of a short-range wireless communication and a communication device that receives a signal transmitted from the mobile terminal toward the authentication target device as a target whether or not operation by a user possessing the mobile terminal is permitted.

The authentication method includes: an acquisition step of acquiring information received by a reception unit provided in the mobile terminal and information detected by a state sensor for detecting a state of the mobile terminal; a determination step of determining the state of the mobile terminal based on the information acquired in the acquisition step; and an execution step of transmitting a connection response signal from a transmission unit provided in the mobile terminal when the state of the mobile terminal satisfies a permission condition, and not transmitting the connection response signal from the transmission unit when the state of the mobile terminal does not satisfy the permission condition. The determination step includes: not performing the state determination before the reception unit receives the connection request signal, and performing the state determination after the reception unit receives the connection request signal.

Further, a authentication program for performing an authentication control including a connection authentication for establishing a communication connection and an operation authentication for operating an authentication target device using a mobile terminal executable of a short-range wireless communication and a communication device that receives a signal transmitted from the mobile terminal toward the authentication target device as a target whether or not operation by a user possessing the mobile terminal is permitted.

The authentication program includes: an acquisition process of acquiring information received by a reception unit provided in the mobile terminal and information detected by a state sensor for detecting a state of the mobile terminal; a determination process for determining the state of the mobile terminal based on the information acquired in the acquisition process; an execution process of transmitting a connection response signal from a transmission unit provided in the mobile terminal when the state of the mobile terminal satisfies a permission condition, and not transmitting the connection response signal from the transmission unit when the state of the mobile terminal does not satisfy the permission condition. The determination process includes: not performing the state determination before the reception unit receives the connection request signal, and performing the state determination after the reception unit receives the connection request signal.

According to the embodiments for the authentication system and the like, the state determination is not performed before the reception unit receives the connection request signal, and the state determination is performed after the reception unit receives the connection request signal. Therefore, it is possible to prevent from performing the state determination before the reception unit receives the connection request signal. Therefore, it is possible to reduce the number of times of state determination and reduce power consumption in authentication control including the state determination, compared to the case of determining the state of the mobile terminal before receiving the connection request signal. Therefore, it is possible to provide an authentication system or the like capable of reducing power consumption related to authentication control.

Multiple embodiments will be described with reference to the drawings. In some embodiments, functionally and/or structurally corresponding and/or associated parts may be given the same reference numerals, or reference numerals with different digit placed on equal to or higher than a hundred place. For corresponding parts and/or associated parts, reference can be made to the description of other embodiments.

First Embodiment

The authentication system 1 is a system that authenticates an authentication target device that requires authentication. As the authentication target device, it is possible to adopt a mobile body such as a vehicle 11, which will be described later, or a device installed in a facility or equipment that does not move, such as a house or an office. Below, the authentication system 1 for a vehicle 11 to which the authentication system 1 is applied will be described.

When the authentication target device is appropriately authenticated using the authentication system 1, the user can perform various operations on the vehicle 11 having the authentication target device. Here, authentication includes connection authentication and operation authentication. The connection authentication is authentication for establishing a communication connection. The operation authentication is authentication for executing the operation of the authentication target device. The connection authentication is permitted, and the operation authentication is permitted in a state in which the connection is established, whereby it is possible for the user, who possesses the mobile terminal 50 connected to the authentication target device, to operate the authentication target device. For example, when the authentication target device is a device that controls locking and unlocking, the locked vehicle 11 can be unlocked by the user performing an unlocking operation after the operation authentication is permitted. On the other hand, when the connection authentication or the operation authentication has not been completed, the unlocking operation is not accepted, and the vehicle 11 remains locked. The unlocking operation by the user is configured to be executable by either the operation of the mobile terminal 50 or the button operation provided on the vehicle 11.

Generally, various buttons such as a button for operating locking/unlocking is disposed on the vehicle 11 side having the authentication target device. The user can control locking/unlocking of the vehicle 11 by operating a button provided on the vehicle 11 in a state where authentication by the authorized user is permitted. This enhances the user's convenience in operations such as locking and unlocking. However, if the authentication is permitted due to a fraudulent act by a third party such as a relay attack, the third party may execute various controls of the vehicle 11 by operating buttons provided on the vehicle 11. Therefore, in the vehicle 11, it is necessary to prevent fraudulent authorization of against the intention of an authorized user.

In FIG. 1, the authentication system 1 includes a vehicle 11 and a mobile terminal 50. The mobile terminal 50 is an information processing terminal, such as a smartphone. The smartphone is also called as a multifunctional mobile phone. A smart phone is a terminal capable of establishing a communication connection with a plurality of devices by short-range wireless communication at the same time. Further, the smart phone may have a plurality of applications other than the authentication application described later. For this reason, it can be said that the terminal is highly likely to be waiting to receive radio waves around the smartphone for the purpose of performing wireless communication with each of various devices. The portable terminal 50 is carried by a user. Below, the case where the portable terminal 50 is a smart phone is demonstrated to an example. Here, the mobile terminal 50 may not be limited to a smart phone as long as it performs connection-type communication. The connection-type communication is a communication method in which a virtual dedicated communication path (that is, a connection) is established with a communication partner before starting wireless communication, and information is transmitted and received through the connection. That is, the connection-type communication is a communication method in which a wireless communication is performed while establishing a communication connection. In the connection-type communication, signals are exchanged to start a communication connection even before the communication connection is completely established.

A vehicle-side unit 3 is mounted on the vehicle 11. The vehicle-side unit 3 performs wireless communication with the mobile terminal 50 to perform connection authentication and operation authentication. Details of the vehicle side unit 3 will be described later. In the authentication system 1, control of the vehicle 11 such as locking/unlocking of the vehicle doors and starting of the driving source of the vehicle 11 is permitted based on the fact that the operation authentication by the code check is established. That is, in the authentication system 1, the mobile terminal 50 functions as an electronic key of the vehicle 11. The control of the vehicle 11 permitted when the operation authentication is established may not be limited to the above example. As the control of the vehicle 11 that is permitted when the operation authentication is established, control of the air conditioner according to an instruction from the mobile terminal 50, transmission of vehicle information to the mobile terminal 50, and the like may be employed.

Figure 2:
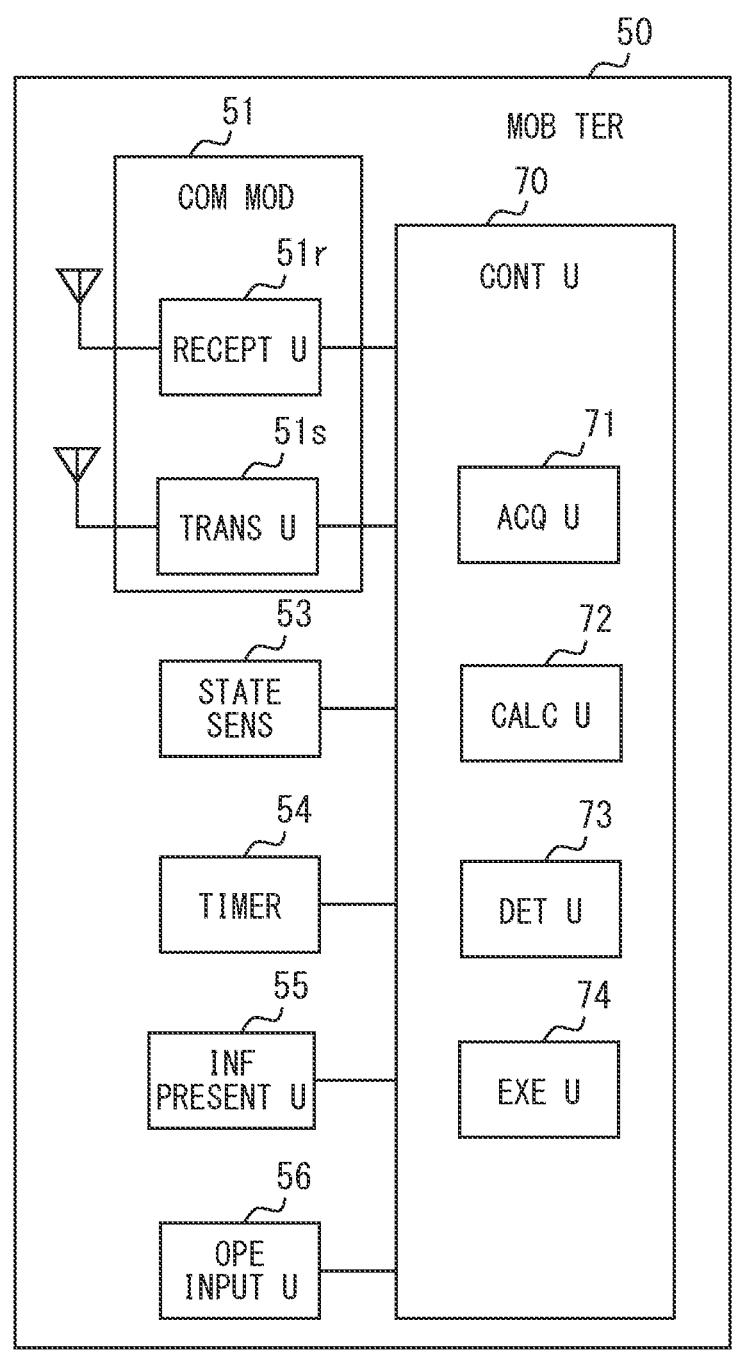
FIG. 2 is a block diagram of a mobile terminal regarding authentication control.

The following will describe a configuration of the mobile terminal 50 with reference to FIG. 2. As shown in FIG. 2, the mobile terminal 50 includes a control unit 70, a communication module 51, a state sensor 53, a timer 54, an information presentation unit 55 and an operation input unit 56. In the present embodiment, for convenience and easy understanding, configurations of the mobile terminal 50 related to the communication connection with the vehicle side unit 3 and the authentication for controlling the vehicle 11 are mainly described, and the other configurations are omitted from description.

The communication module 51 is a device for establishing a communication connection with the vehicle-side unit 3 and performing short-range wireless communication. The short-range wireless communication referred to here is, for example, communication conforming to a predetermined short-range wireless communication standard whose communication range is limited to about several tens of meters at the maximum. Bluetooth (registered trademark) Low Energy (hereinafter referred to as BLE) and Near Field Communication (hereinafter referred to as NFC) may be adopted as such a short-range wireless communication standard. Note that NFC has a particularly short communication distance among short-range wireless communications. The NFC has a maximum communication distance of several tens of centimeters. Communication with a communication distance of less than 1 meter, such as NFC, may also be called near-field communication by distinguishing it from short-range wireless communication with a communication distance of 1 meter or more, such as BLE. The BLE is a communication mode with low power consumption by keeping the communication speed low. In the present embodiment, a case where a BLE-compliant communication is performed is described as an example as the short-range wireless communication. In the BLE, radio waves in a 2.4 GHz band are used. The 2.4 GHz band includes radio waves from 2400 MHz to 2500 MHz.

The communication module 51 includes a reception unit 51*r* capable of receiving short-range wireless signals and a transmission unit 51*s* capable of transmitting short-range wireless signals. The reception unit 51*r* and the transmission unit 51*s* each have an antenna for communication.

The state sensor 53 is a sensor for detecting the state of the mobile terminal 50. The state sensor 53 is a sensor for detecting movement of the mobile terminal 50 in three dimensions. As the state sensor 53, an acceleration sensor that measures acceleration or an angular velocity sensor that measures angular velocity may be used. Here, as the state sensor 53, sensors other than the sensors described above may be employed. When an acceleration sensor is employed as the state sensor 53, the state sensor 53 detects a sensor value corresponding to acceleration. Also, when an acceleration sensor is employed as the state sensor 53, sensor values corresponding to acceleration are detected in three directions, i.e., the X direction, the Y direction, and the Z direction, which are orthogonal to each other. An example in which the state sensor 53 is an acceleration sensor will be described below.

The state sensor 53 repeats detection at specific intervals. For example, when the detection cycle is set to 100 milliseconds, acceleration is detected every 100 milliseconds. The detection period may not always be constant. For example, the detection period may be set to 100 milliseconds when the mobile terminal 50 is in the activation state, and may be set to 60 seconds when the mobile terminal 50 is in the sleep state. According to this, the sleep state can reduce the detection frequency of the state sensor 53 and reduce the power consumed by the state sensor 53 compared to the activation state.

The timer 54 is a device for measuring time. The timer 54 can measure the elapsed time from the start of specific control to the present time, for example.

The information presentation unit 55 is a device for presenting information to the user. As examples of the information presentation unit 55, a display device that presents information by display, a voice output device that presents information by voice, and the like may be adopted.

The operation input unit 56 is a device for receiving operation input from the user. The operation input unit 56 receives operation inputs (hereinafter, referred to as control request operation inputs) relating to requests for the control of the vehicle 11 from the user. An example of the control request operation input is an operation input requesting locking/unlocking of the vehicle door. Another example of the control request operation input is an operation input requesting operation of the air conditioner of the vehicle 11. Another example of the control request operation input is an operation input requesting transmission of vehicle information such as tire pressure. The operation input unit 56 may be a touch panel integrated with the display device of the information presentation unit 55.

The control unit 70 includes, for example, a processor and a memory. The control unit 70 executes a control relating to the connection authentication for establishing the communication connection between the vehicle-side unit 3 and the communication module 51. The control unit 70 performs control related to operation authentication for allowing the user who owns the mobile terminal 50 to operate the authentication target device in a state where the communication connection between the vehicle-side unit 3 and the communication module 51 is established.

When the information acquired from the vehicle-side unit 3 is information to be presented to the information presentation unit 55, the control unit 70 causes the information presentation unit 55 to present this information. For example, when the vehicle information transmitted from the vehicle side unit 3 is acquired in response to the request for transmission of the vehicle information, the vehicle information may be presented by the information presentation unit 55.

The control unit 70 includes an acquisition unit 71, a calculation unit 72, a determination unit 73 and an execution unit 74. The acquisition unit 71 acquires information about the vehicle 11 and information about the mobile terminal 50. The information about the vehicle 11 acquired by the acquiring unit 71 is information received by the reception unit 51r, such as a connection request signal before establishment of communication connection and a request signal after establishment of communication connection. The information about the mobile terminal 50 acquired by the acquisition unit 71 includes information on sensor values detected by the state sensor 53, information input to the operation input unit 56, and the like.

The calculation unit 72 uses the information detected by the state sensor 53 to calculate various physical quantities. The calculation unit 72 calculates, for example, a composite value of acceleration from the acceleration in the X direction, the acceleration in the Y direction, and the acceleration in the Z direction detected by the state sensor 53. The calculation unit 72 also calculates a smoothed value from a plurality of composite values detected at different timings.

The determination unit 73 performs state determination for determining the state of the mobile terminal 50 from the value calculated by the calculation unit 72. The execution unit 74 executes control related to connection authentication based on the determination result of the determination unit 73. Details of the state determination by the determination unit 73 and the control executed by the execution unit 74 will be described later.

The vehicle side unit 3 will be described with reference to FIG. 3. The vehicle-side unit 3 includes a communication ECU 30, a vehicle sensor 31, a lock/unlock switch 32 and an activation switch 33. The vehicle-side unit 3 includes a BLE communication device 35, a body ECU 36, a power unit ECU 37, a verification ECU 38 and an air conditioner ECU 39. The communication ECU 30, the vehicle sensor 31, the body ECU 36, the power unit ECU 37, the verification ECU 38, and the air conditioner ECU 39 are connected to an in-vehicle LAN.

The vehicle sensor 31 is a sensor group for detecting various states of a subject vehicle. The vehicle sensor 31 may include a seating sensor which detects a passenger seated state of each seat in the subject vehicle, a door courtesy switch for detecting an open or close state of the vehicle door of the subject vehicle, and the like. The vehicle sensor 31 may include a sensor to detect traveling state of the subject vehicle, a sensor to detect an operation state of the subject vehicle, and the like. The vehicle sensor 31 may further include a sensor such as a vehicle speed sensor to detect a vehicle speed, a shift position sensor to detect a transmission shift position, and the like.

The lock/unlock switch 32 is a switch for requesting lock or unlock of vehicle doors such as a driver seat door, a passenger seat door, and a trunk room door. The lock/unlock switch 32 is provided on an outer door handle of the vehicle 11 or the like. A touch switch or a mechanical button switch may be used as the lock/unlock switch 32. A signal from the lock/unlock switch 32 is output to the body ECU 36.

The activation switch 33 is a switch for requesting activation of a driving power source of the vehicle. The activation switch 33 is provided in front of the driver's seat. A mechanical button switch may be employed as the activation switch 33. A signal from the activation switch 33 is output to the verification ECU 38.

The BLE communication device 35 has a communication module including an IC, an antenna, a communication circuit, and the like. The BLE communication device 35 performs a BLE-compliant wireless communication according to an instruction from the communication ECU 30. The BLE communication device 35 has an RSSI measurement circuit that measures the received signal strength of received radio waves (hereinafter referred to as RSSI).

After establishing a communication connection with the communication module 51 of the mobile terminal 50, the BLE communication device 35 receives the radio waves and measures the RSSI by sniffing (that is, intercepting) radio waves used for wireless communication. The BLE communication device 35 also receives radio waves transmitted from the communication module 51 of the mobile terminal 50 and measures the RSSI before establishing a communication connection with the communication module 51 of the mobile terminal 50. An example of such radio waves is a connection request signal, which is a radio wave used for transmitting a connection request before establishing a communication connection.

The BLE communication devices 35 are provided, for example, at a plurality of locations inside and outside the vehicle compartment of the subject vehicle. The BLE communication device 35 may preferably measure the RSSI of radio waves transmitted from the mobile terminal 50 at each installation location. For example, the BLE communication device 35 is arranged on, for example, an outer surface of the vehicle door, a roof of the vehicle 11, a bonnet, a pillar, or the like so that a predetermined range of the outside of the vehicle compartment becomes a strong electric field area. Further, the BLE communication device 35 is arranged on a boundary portion between a center console and an instrument panel, an inner surface of the vehicle door, a trunk room, and the like, so that a predetermined range within an inside of the vehicle compartment becomes a strong electric field area.

Figure 4:
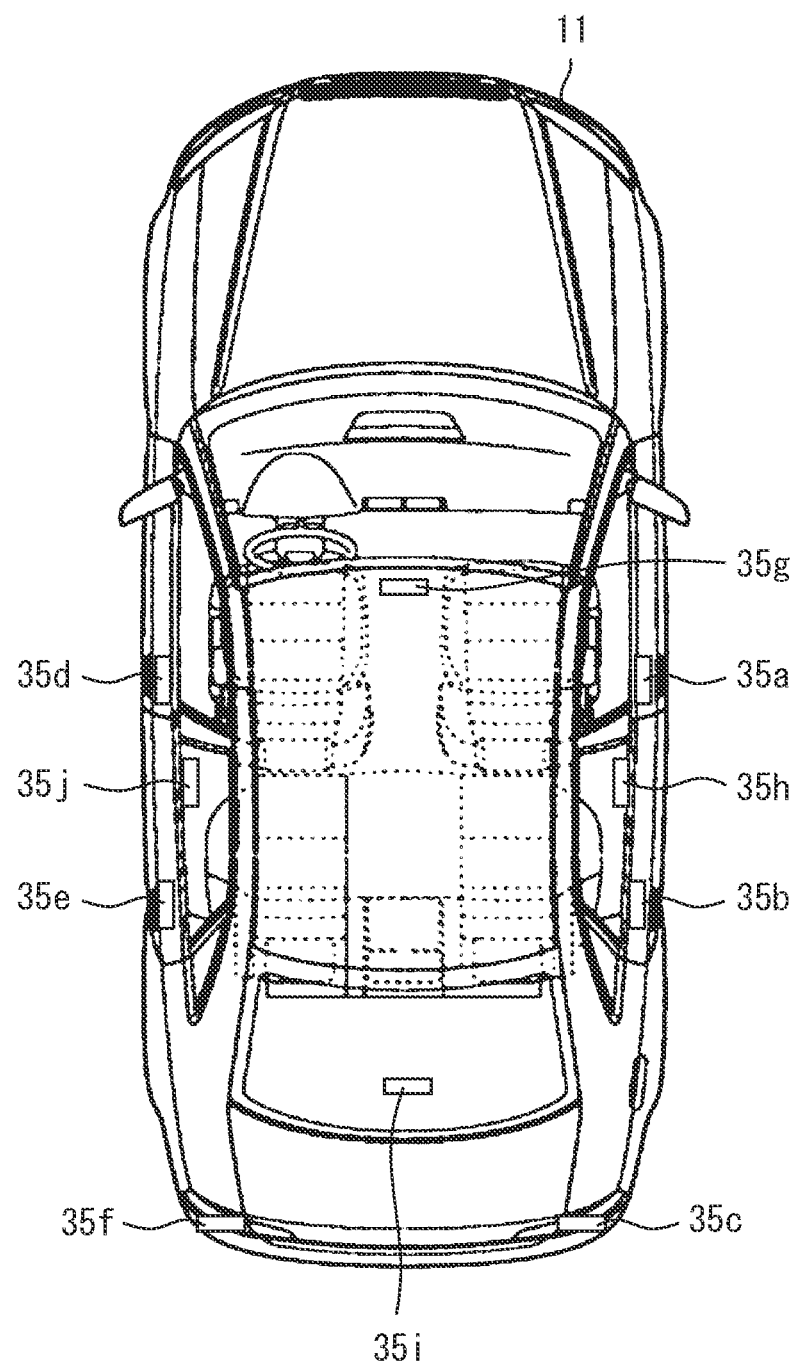
FIG. 4 is a diagram showing a top view of the arrangement of a BLE communication device provided in a vehicle.

In FIG. 4, the vehicle 11 includes BLE communication devices 35a to 35f disposed from the front to the rear on the left and right sides of the vehicle 11 as the BLE communication device 35 arranged outside the vehicle compartment. The vehicle 11 also includes BLE communication devices 35g to 35j in the vehicle compartment as the BLE communication device 35 arranged in the vehicle compartment.

The BLE communication device 35a is arranged on the outer surface of the right door of the front seat of the vehicle 11. The BLE communication device 35b is arranged on the outer surface of the right door of the rear seat of the vehicle 11. The BLE communication device 35c is arranged near the right corner at the rear end of the vehicle 11. The BLE communication device 35d is arranged on the outer surface of the left door of the front seat of the vehicle 11. The BLE communication device 35e is arranged on the outer surface of the left door of the rear seat of the vehicle 11. The BLE communication device 35f is arranged near the left corner at the rear end of the vehicle 11.

The BLE module 35g is arranged on a boundary portion between the center console and the instrument panel of the vehicle 11. The BLE communication device 35h is arranged on the inner surface of the right door of the rear seat of the vehicle 11. The BLE communication device 35i is arranged on the floor of the trunk room of the vehicle 11. The BLE communication device 35j is arranged on the inner surface of the left door of the rear seat of the vehicle 11.

The BLE communication device 35 outputs the measured RSSI to the communication ECU 30. The RSSI has a distance attenuation characteristic. Therefore, using the RSSI measured by the BLE communication device 35, it is possible to calculate the distance between the BLE communication device 35 and the mobile terminal 50 that is the transmission source of the radio wave. Further, the position of the mobile terminal 50 with respect to the subject vehicle can be determined from the distance between the BLE communication device 35 and the mobile terminal 50.

For example, the distance calculated from each of the RSSIs measured by three or more BLE communication devices 35 and the arrangement positions of these BLE communication devices 35 in the subject vehicle are acquired. Thereby, the position of the mobile terminal 50 with respect to the reference point of the subject vehicle can be specified by the principle of triangulation based on the acquired information.

In the present embodiment, a configuration for specifying the position of the mobile terminal 50 with respect to the vehicle using RSSI will be described as an example, alternatively, the method for specifying the position of the mobile terminal 50 may not be necessarily limited to this feature. For example, a configuration may be adopted in which the position of the mobile terminal 50 with respect to the subject vehicle is specified using an AoA (i.e., Angle of Arrival) method that performs localization using the arrival angle of radio waves. The position of the mobile terminal 50 with respect to the vehicle may be specified by using a Time of Flight (i.e., ToF) method in which localization is performed by using the flight time of the radio waves. Alternatively, the position of the mobile terminal 50 with respect to the vehicle may be specified by using the Time Difference of Arrival (i.e., TDOA) method in which localization is performed by using the arrival time difference of the radio waves.

Figure 3:
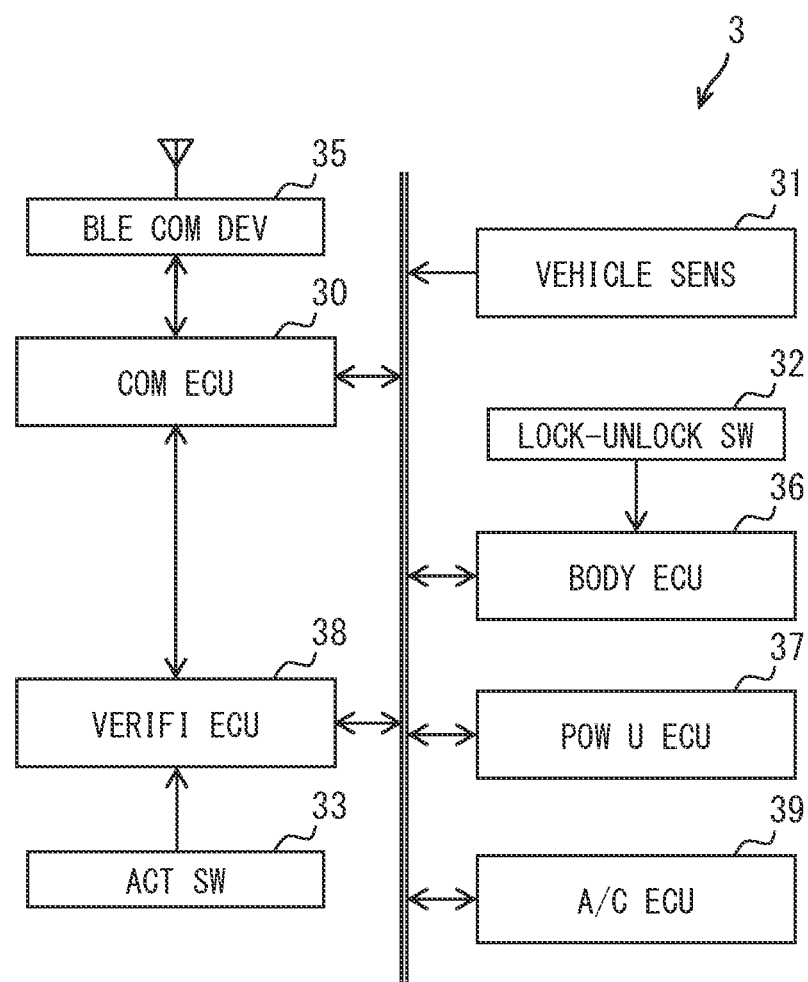
FIG. 3 is a block diagram of a vehicle-side unit relating to authentication control.

In FIG. 3, the body ECU 36 is an electronic control device including a processor, a memory, and the like, for example. The body ECU 36 may lock and unlock each vehicle door by transmitting a drive signal for controlling locking and unlocking of each vehicle door to a door lock motor provided in each vehicle door. A locking/unlocking switch 32 is connected to the body ECU 36, and a signal corresponding to whether the locking/unlocking switch 32 is turned on or off is input.

The power unit ECU 37 is an electronic control unit including, for example, a processor, a memory, and the like. The power unit ECU 37 controls a traveling drive source such as an internal combustion engine or a motor generator of the vehicle 11. When the power unit ECU 37 acquires an activation permission signal of the traveling drive source from the verification ECU 38, the power unit ECU 37 activates the traveling drive source of the subject vehicle.

The verification ECU 38 is an electronic control unit including, for example, a processor, a memory, and the like. The verification ECU 38 performs processing related to permission to use the vehicle 11. In other words, the verification ECU 38 performs processing related to connection authentication and operation authentication of the authentication target device. The verification ECU 38 inputs a trigger (hereinafter referred to as a request trigger) for requesting transmission of a connection request signal to the communication ECU 30 according to a signal input from the body ECU 36, the vehicle state, and the like. Here, the connection request signal is also called an advertising packet. For example, when the vehicle 11 is parked and all the doors of the vehicle 11 are locked, the verification ECU 38 inputs a request trigger for periodically transmitting a connection request signal to the communication ECU 30 after a certain period of time has elapsed. The end timing of the periodical transmission of the connection request signal may be, for example, the timing when the subject vehicle starts running.

Further, the verification ECU 38 sends a random number code, which is to be transmitted to the mobile terminal 50 established the communication connection with the vehicle 11, to the communication ECU 30. The communication ECU 30 controls the BLE communication device 35 to transmit the random number code to the mobile terminal 50. The verification ECU 38 acquires the encryption code transmitted from the mobile terminal 50 that has received the random number code via the BLE communication device 35 and the communication ECU 30. Then, the verification ECU 38 performs a code verification between an encryption code acquired from the mobile terminal 50 and an encryption code acquired by encrypting the random number code transmitted to the mobile terminal 50 with the secret key of the common key encryption method and the encryption algorithm. Alternatively, the verification ECU 38 acquires the position of the mobile terminal 50 (hereinafter, terminal position) with respect to the subject vehicle determined by the communication ECU 30 from the communication ECU 30. The code verification provides an example of operation authentication.

The transmission of the random number code to the mobile terminal 50 may be performed sequentially while the communication connection between the vehicle 11 and the mobile terminal 50 is being established. Also, the random number code may be transmitted to the mobile terminal 50 when a predetermined event is detected. The detection of the predetermined event includes detection of operation of the lock/unlock switch 32, detection of operation of the activation switch 33, establishment of a communication connection with the subject vehicle, reception of the aforementioned lock/unlock request, and the like. The verification ECU 38 detects the operation of the lock/unlock switch 32 from the signal of the lock/unlock switch 32. The verification ECU 38 detects the operation of the activation switch 33 from the signal of the activation switch 33. The verification ECU 38 detects establishment of a communication connection with the vehicle 11 and reception of a lock/unlock request by monitoring the communication ECU 30.

For example, when all of the following four conditions are satisfied, the verification ECU 38 sends a signal permitting locking/unlocking of each vehicle door to the body ECU 36. One of the conditions is that the vehicle 11 is parked. One of the conditions is that the vehicle door is closed. One of the conditions is that the aforementioned code verification is established. One of the conditions is that the mobile terminal 50 is positioned outside the vehicle compartment. When these four conditions are satisfied, locking and unlocking of each vehicle door is permitted. When the vehicle door is locked, the vehicle door may be permitted to be unlocked. When the vehicle door is unlocked, the vehicle door may be permitted to be locked.

The verification ECU 38 does not send a signal permitting locking/unlocking of each vehicle door to the body ECU 36 when the mobile terminal 50 is not positioned outside the vehicle compartment even when the aforementioned code verification is established. In this case, locking and unlocking of each vehicle door is not permitted. The verification ECU 38 does not send the signal to permit locking/unlocking of each vehicle door to the body ECU 36 when the above-mentioned code verification is not established. For example, a parking state of the subject vehicle is determined based on detection results detected by the vehicle speed sensor, the shift position sensor, and the like among the vehicle sensors 31. A closing state of the vehicle door is determined based on the signal of the door courtesy switch in the vehicle sensor 31. As for the position of the mobile terminal 50, the terminal position obtained from the communication ECU 30 may be used.

When both of a condition of permission of locking/unlocking of each vehicle door and a condition of detection of the operation of the lock/unlock switch 32 are satisfied, the body ECU 36 performs lock or unlock of each vehicle door without receiving the above-mentioned lock/unlock request. This makes it possible to implement the smart entry function. Alternatively, the body ECU 36 may be configured to perform lock or unlock of each vehicle door without detecting an operation of the lock/unlock switch 32 when an operation of lock or unlocking of each vehicle door is permitted while receiving the above-mentioned lock/unlock request. This makes it possible to implement a keyless entry function.

For example, when the operation of the activation switch 33 is detected, the verification ECU 38 sends an activation permission signal for the traveling drive source to the power unit ECU 37 if the aforementioned code verification is established and the mobile terminal 50 is located inside the vehicle compartment. As a result, the traveling drive source of the subject vehicle is activated. On the other hand, the verification ECU 38 does not send the activation permission signal of the traveling drive source to the power unit ECU 37 when the mobile terminal 50 is not located inside the vehicle compartment even if the aforementioned code verification is established. In this case, the traveling drive source of the subject vehicle is not activated. The verification ECU 38 does not send the activation permission signal of the traveling drive source to the power unit ECU 37 if the above-mentioned code verification is not established.

The air-conditioner ECU 39 is an electronic control unit including, for example, a processor, a memory, and the like. The air-conditioner ECU 39 controls an air-conditioner that performs the air-conditioning in a compartment of the vehicle 11. When the air-conditioner ECU 39 acquires the above-mentioned air-conditioner control request via the communication ECU 30, the air-conditioner ECU 39 operates the air-conditioner according to the air-conditioner control request. As an example of the operation of the air-conditioner according to the air conditioning control request, a start of an operation of the air-conditioner, an adjustment of the air-conditioning temperature, and the like may be adopted.

The communication ECU 30 includes, for example, a processor, a memory, an I/O circuit, and a bus connecting them, and executes various processes by performing a control program stored in the memory. The communication ECU 30 is connected to the BLE communication device 35, the verification ECU 38, and the in-vehicle LAN. The communication ECU 30 executes various processes related to control of communication in the BLE communication unit 35. The memory referred to here is a non-transitory tangible storage medium, and non-transitorily stores programs and data that can be read by a computer. The non-transitory tangible storage medium may be provided by a semiconductor memory or a magnetic disk.

Figure 5:
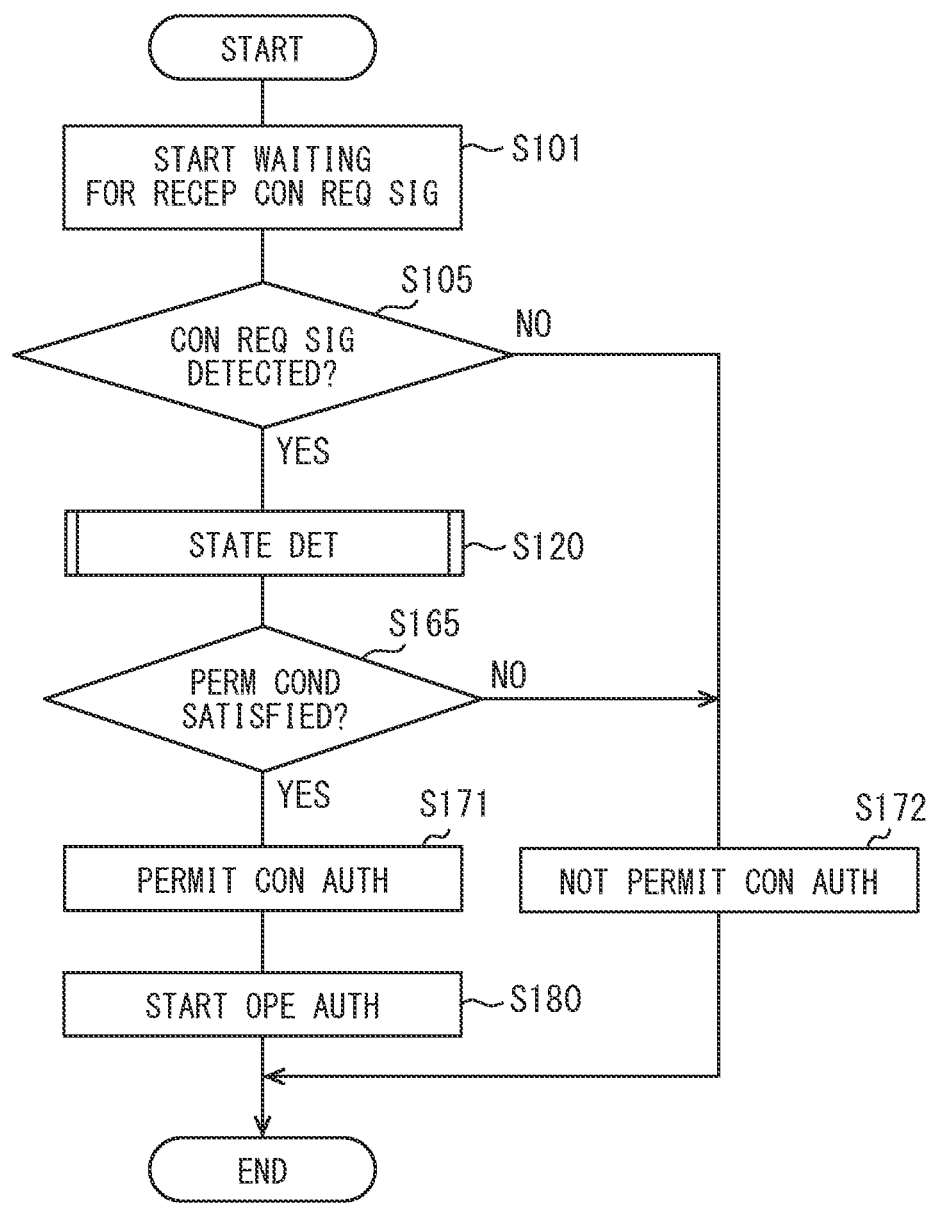
FIG. 5 is a flowchart regarding authentication control.

Of the authentication control in the authentication system 1, a part particularly related to connection authentication will be described below. In FIG. 5, when the user activates an authentication application that is an application for authenticating the vehicle 11 using the mobile terminal 50, authentication control is started. Here, even when the application for authentication is running, if the setting of the mobile terminal 50 is such that the short-range wireless communication is not permitted, the authentication control is not started.

When authentication control is started, the control unit 70 starts waiting for a connection request signal in step S101. More specifically, the mobile terminal 50 is brought into a state capable of receiving a connection request signal transmitted from the BLE communication device 35 of the vehicle 11. Here, the mobile terminal 50 waits for a connection request signal in the foreground state and background state of the authentication application. Moreover, the mobile terminal 50 waits for a connection request signal even in the sleep state of the mobile terminal 50. After starting to wait for a connection request signal, the process proceeds to step S105.

In step S105, the determination unit 73 determines whether the reception unit 51r of the mobile terminal 50 has detected the connection request signal transmitted from the BLE communication device 35 of the vehicle 11. In other words, the determination unit 73 determines whether or not the mobile terminal 50 exists near the vehicle 11. Here, when the portable terminal 50 exists near the vehicle 11, it can be determined that the possibility of the user performing an operation such as locking/unlocking the vehicle 11 is high. On the other hand, when the mobile terminal 50 exists far from the vehicle 11, it can be determined that the possibility of the user performing operations such as locking and unlocking the vehicle 11 is low. When the reception unit 51r detects the connection request signal, it determines that the portable terminal 50 is present at a position close to the vehicle 11, and the process proceeds to step S120. On the other hand, when the reception unit 51r does not detect the connection request signal, it is determined that the portable terminal 50 is located far from the vehicle 11, and the process proceeds to step S172. Step S105 provides an example of an acquisition step and an acquisition process.

Figure 6:
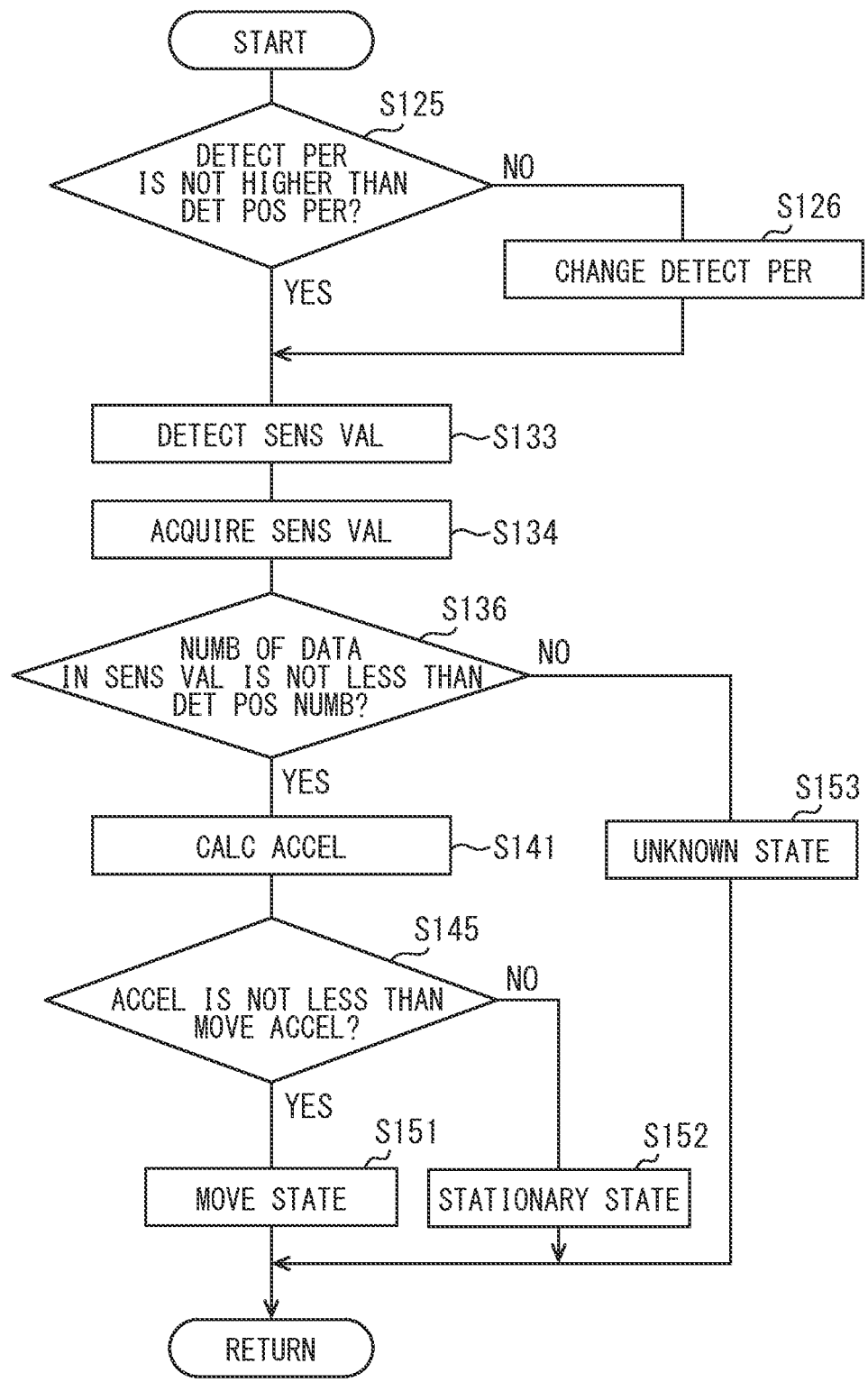
FIG. 6 is a flowchart showing a processes executed in S120 of FIG. 5.

In step S120, the control unit 70 executes a state determination. Details of the state determination are described below. Step S120 provides an example of a determination step and determination process. In FIG. 6, when the state determination is started, the determination unit 73 determines in step S125 whether or not the detection period of the state sensor 53 is equal to or less than the determination possible cycle. The determination possible cycle is, for example, 100 milliseconds. When the detection period is equal to or shorter than the determination possible cycle, the process proceeds to step S133. On the other hand, when the detection period is longer than the determination possible cycle, the process proceeds to step S126.

The purpose of executing this step S125 is to determine whether or not the authentication process including the state determination can be completed within the authentication processing time after acquiring the number of sensor values equal to or more than the number of data required for state determination as the determination possible number of data. The authentication processing time is set to the extent that the time until the authentication target device functions does not give the user a sense of discomfort. If the authentication processing time is 2 seconds, the state determination will be performed for a much shorter time than 2 seconds. In step S125, it is determined whether or not the number of data required for state determination can be detected within the time available for state determination during the entire authentication process.

In step S126, the control unit 70 changes the detection period to a period equal to or less than the determination possible cycle. As a result, the state sensor 53 can detect the number of data required for state determination. After changing the detection period, the process proceeds to step S133.

At step S133, the state sensor 53 detects a sensor value. At this time, since the detection period is a short period equal to or shorter than the determination possible cycle, the sensor value is detected finely. The acceleration sensor, which is the state sensor 53, detects acceleration as a sensor value. After detecting the sensor value, the process proceeds to step S134. Sensor values provide an example of information used for state determination.

In step S134, the acquisition unit 71 acquires sensor values. Specifically, detection and acquisition of sensor values are repeated multiple times to acquire multiple sensor values with different detection timings. Temporarily, when the acquired sensor value is a clearly abnormal value, the abnormal value may not be acquired, and only the normal value may be acquired as the sensor value. In this case, the number of sensor value data detected by the state sensor 53 and the number of sensor value data acquired by the acquisition unit 71 may be different. After acquiring the sensor value, the process proceeds to step S136. Step S134 provides an example of an acquisition step and an acquisition process.

In step S136, the determination unit 73 determines whether or not the number of acquired sensor value data is equal to or greater than the determination possible number. The purpose of executing step S136 is to determine whether the state determination can be executed with high accuracy based on a sufficient number of sensor values. The determination possible number of is ten, for example. In the following, a case of acquiring 10 data will be described as an example. When the number of acquired sensor value data is greater than or equal to the determination possible number, it is determined that appropriate state determination is possible, and the process proceeds to step S141. On the other hand, if the number of acquired sensor value data is less than the determination possible number, it is determined that appropriate state determination is impossible, and the process proceeds to step S153.

In step S141, the calculation unit 72 calculates acceleration from the acquired sensor values. More specifically, a composite value of acceleration is calculated from the three sensor values of the X-direction sensor value, the Y-direction sensor value, and the Z-direction sensor value, and a value obtained by smoothing the composite value is calculated. When the number of data is 10, a composite value of 10 accelerations at different timings is calculated from 10 sensor values acquired at different timings. Furthermore, a value obtained by smoothing the composite value of ten data is calculated as an average acceleration. For smoothing, a method such as a simple moving average method or an exponential moving average method may be used. This average acceleration is set as the acceleration used for state determination. After calculating the acceleration, the process proceeds to step S145.

In step S145, the determination unit 73 determines whether the calculated acceleration is greater than or equal to the movement acceleration. The information about the movement acceleration may be preferably set to be updatable by, for example, being delivered from the server to the mobile terminal 50. When the acceleration is greater than or equal to the movement acceleration, the process proceeds to step S151. On the other hand, when the acceleration is less than the movement acceleration, the process proceeds to step S152.

In step S151, the determination unit 73 determines that the mobile terminal 50 is in the moving state. A moving state is a state in which the position of the mobile terminal 50 changes over time. The moving state includes a state in which the user is holding the portable terminal 50 in his/her hand and operating it. The moving state includes a state in which the user carrying the mobile terminal 50 is moving. After determining that it is in the moving state, the process proceeds to step S165.

In step S152, the determination unit 73 determines that the mobile terminal 50 is in the stationary state. The stationary state is a state in which the position of the mobile terminal 50 does not change over time. The stationary state includes a state in which the mobile terminal 50 is not operated by the user. The stationary state includes a state in which the user does not carry the mobile terminal 50. After determining that it is in the stationary state, the process proceeds to step S165.

In step S153, the determination unit 73 determines that the state of the mobile terminal 50 is not known. The unknown state is a state in which it cannot be determined whether the position of the mobile terminal 50 has changed over time. The unknown state includes a state in which the sensor value cannot be detected due to, for example, the state sensor 53 malfunctioning. After determining that it is in the unknown state, the process proceeds to step S165.

In step S165 of FIG. 5, the determination unit 73 determines whether the state of the mobile terminal 50 satisfies the permission condition. A permission condition is a condition for permitting connection authentication. The permission conditions include at least that the mobile terminal 50 is in the moving state. The permission conditions do not include at least that the mobile terminal 50 is in a stationary state. The permission condition may or may not include that the mobile terminal 50 is in an unknown state. When the permission condition is satisfied, the process proceeds to step S171. On the other hand, if the permission condition is not satisfied, the process proceeds to step S172.

In step S171, the execution unit 74 permits connection authentication. More specifically, a connection response signal is generated, and the connection response signal is transmitted from the transmission unit 51s to the BLE communication device 35 to establish communication connection. The connection authentication is terminated while maintaining the established communication connection. After permitting the connection authentication, the process proceeds to step S180. Step S171 provides an example of an execution step and an execution process.

In step S180, the control unit 70 starts operation authentication. In operation authentication, a request signal and a response signal are exchanged. The random number code detected as the request signal is encrypted with the secret key and the encryption algorithm to generate the encrypted code as the response signal. The secret key and the encryption algorithm are the secret key and the encryption algorithm used in the common key cryptosystem. The control unit 70 outputs the generated encryption code to the communication module 51 as a code for code verification. The communication module 51 transmits the encryption code output from the control unit 70 to the vehicle-side unit 3. As a result, the communication module 51 transmits the encryption code to the vehicle side unit 3 on radio waves in the 2.4 GHz band. The code for code verification may be a code distributed from the server or the like as a legitimate key information of the vehicle 11.

A state in which operation authentication is permitted is a state in which various controls related to the vehicle 11 can be executed. More specifically, when the operation input unit 56 receives a control request operation input, the control unit 70 transmits a vehicle control request corresponding to the control request operation input to the vehicle-side unit 3 through the connection. As an example of the vehicle control request, a lock/unlock request in response to an operation input which requests locking or unlocking of a vehicle door may be adopted. As an example of the vehicle control request, an air-conditioning control request corresponding to an operation input requesting an operation of the air-conditioning device of the vehicle 11 may be adopted. As an example of the vehicle control request, a vehicle information request in response to an operation input requesting transmission of vehicle information such as tire pressure may be adopted. For example, the air-conditioning control request includes requests for starting the operation of the air-conditioning system of the vehicle 11, setting the air-conditioning temperature, and the like. By permitting the connection authentication and the operation authentication between the vehicle 11 and the mobile terminal 50 in this way, the vehicle 11 can be controlled by operating the mobile terminal 50. After operation authentication, a series of authentication control ends.

In step S172, the execution unit 74 disallows connection authentication. More specifically, the transmission unit 51s does not transmit the connection response signal to the BLE communication device 35. Since a connection response signal is not returned from the mobile terminal 50 in response to the connection request signal transmitted from the BLE communication device 35, the communication connection is not established, and a state in which connection authentication is not permitted is maintained. Since the connection authentication is not permitted, it is in a state where the operation authentication cannot proceed. A series of authentication control ends under a state where the connection authentication is not permitted. As a result, even if a third party operates the lock/unlock switch 32 or the like, a state is maintained in which control for switching between locking and unlocking is not executed. Step S172 provides an example of an execution step and an execution process.

According to the embodiment described above, the determination unit 73 does not perform state determination before the reception unit 51r receives the connection request signal, and performs state determination after the reception unit 51r receives the connection request signal. Therefore, when the reception unit 51r does not receive the connection request signal, the state determination is not executed. Therefore, it is possible to prevent the state determination of the mobile terminal 50 from being executed at a timing when the state determination of the mobile terminal 50 is not required. Therefore, it is possible to provide an authentication system 1 capable of reducing power consumption related to authentication control.

The acquisition unit 71 does not acquire information detected by the state sensor 53 before the reception unit 51r receives the connection request signal, and acquires the information detected by the state sensor 53 after the reception unit 51r receives the connection request signal. Therefore, the sensor value is not acquired when the reception unit 51r does not receive the connection request signal. Therefore, it is possible to suppress the process of acquiring the sensor value and calculating the acceleration at the timing when it is not necessary to determine the state of the mobile terminal 50.

When the detection period for detecting information by the state sensor 53 is longer than the determination possible period, the control unit 70 changes the detection period to be equal to or less than the determination possible period. Therefore, it is easy to prevent a situation in which the acceleration cannot be calculated appropriately due to a small number of sensor value data. In other words, the state determination can be performed based on sensor values with a large number of data. Here, the larger the number of sensor value data, the easier it is to accurately calculate a physical quantity such as acceleration and accurately determine the state of the mobile terminal 50. Therefore, by setting the detection period to a short period equal to or shorter than the determination period, many sensor values can be obtained in a short period of time, and it is easy to improve the accuracy of state determination.

The control unit 70 has a permission condition that the mobile terminal 50 is in a moving state. Therefore, even if the distance between the mobile terminal 50 and the vehicle 11 is short, the authentication is not permitted when the mobile terminal 50 is in a stationary state. Therefore, it is easy to suppress permission of authentication by an unauthorized method by a third party. In addition, the moving state includes a state in which the user carries the mobile terminal 50 and moves without operating the mobile terminal 50. Therefore, the authentication can be completed even if the mobile terminal 50 remains in the sleep state. Therefore, it is easy to improve the convenience of the authentication system 1.

The determination unit 73 determines that the state is unknown when the number of pieces of information used for state determination is less than the determination possible number. Therefore, when it is difficult to accurately determine the state, it can be determined that the state is an unknown state, which is a state that belongs to neither the moving state nor the stationary state. Therefore, it is possible to prevent from being erroneously determined to be in the stationary state even though the position of the mobile terminal 50 has changed. In addition, it is possible to prevent from being erroneously determined to be in a moving state even though the position of the mobile terminal 50 has not changed.

The mobile terminal 50 is a smartphone capable of communication connection with a plurality of devices at the same time through short-range wireless communication. In addition, smart phones are terminals that are expected to use various applications in addition to authentication applications. Therefore, the mobile terminal 50 waits for signals under a condition that it will communicate with each of various devices using short-range wireless signals. Here, the power consumed by the mobile terminal 50 by waiting for short-range wireless signals is constant regardless of the types and number of applications. Therefore, the power consumed by the mobile terminal 50 when waiting for a short-range wireless signal does not change much between when the authentication application is used and when the authentication application is not used. Therefore, authentication control using the mobile terminal 50 can be executed while suppressing a large increase in power consumption.

The authentication method of the authentication system 1 includes a determination step of not performing state determination before the reception unit 51r receives the connection request signal, but performing state determination after the reception unit 51r receives the connection request signal. Further, the authentication program of the authentication system 1 has a determination process in which state determination is not performed before the reception unit 51r receives the connection request signal, and state determination is performed after the reception unit 51r receives the connection request signal. Therefore, when the reception unit 51r does not receive the connection request signal, the state determination is not executed. Therefore, it is possible to prevent the state determination of the mobile terminal 50 from being executed at a timing when the state determination of the mobile terminal 50 is not required. Therefore, it is possible to provide an authentication method and an authentication program capable of reducing power consumption related to authentication control.

It may be preferable to perform an initial operation check in the mobile terminal 50 before starting authentication control. In the initial operation check, it is checked whether or not the mobile terminal 50 can acquire the sensor value of the state sensor 53. More specifically, detection and acquisition of sensor values are repeatedly performed during a predetermined check period to check whether or not the sensor values change over time. As the check period, a period during which the user of the mobile terminal 50 is expected to hold and operate the mobile terminal 50 at least once is set. The check period is, for example, 24 hours. When the sensor value changes even a little during the check period, it is determined that the sensor value has been acquired, and the authentication control described above is performed as necessary. On the other hand, if the sensor value does not change at all during the check period, it is determined that the sensor value cannot be obtained, and the user is notified that the sensor value cannot be obtained. If the sensor value cannot be obtained, the status is always determined to be unknown in the state determination. Therefore, when it is confirmed by the initial operation check that the sensor value cannot be acquired, it may be preferable to let the user set whether or not to include the unknown state of the mobile terminal 50 in the permission conditions.

In the state determination, the moving state and the stationary state may be determined based on a physical quantity other than the average acceleration. For example, the state may be determined based on the frequency characteristics of acceleration. Alternatively, the state determination may be made based on the average angular velocity. Also, the state determination may be performed by combining different physical quantities such as acceleration and angular velocity.

In the state determination, the state of the portable terminal 50 may be determined from a state determination model other than whether the acceleration is greater than or equal to the movement acceleration. As the state determination model, a model that distinguishes between the moving state and the stationary state by the vibration pattern can be adopted. In this case, a vibration pattern determined to be in a moving state and a pattern determined to be in a stationary state are set in advance. An example of a vibration pattern determined to be in a moving state is a vibration pattern obtained when the mobile terminal 50 is disposed in the pocket of the user's clothes and the user stands still. An example of a vibration pattern determined to be in a moving state is a vibration pattern obtained when the user is standing still while holding the mobile terminal 50 in his/her hand. An example of a pattern determined to be in a stationary state is a vibration pattern obtained when the mobile terminal 50 is placed on an audio device that vibrates, such as a speaker. An example of a pattern determined as a stationary state is a vibration pattern obtained when the mobile terminal 50 is placed on a device such as a microwave oven that vibrates as the door is opened and closed. By providing a plurality of vibration patterns as described above and determining which vibration pattern the current vibration pattern of the mobile terminal 50 is close to, the state of the mobile terminal 50 is determined. Also, the state determination may be performed using a plurality of state determination models. By using a plurality of state determination models, it is easy to improve the accuracy of state determination.

Before starting authentication control, it may be preferable to perform a process of obtaining an offset that corrects individual differences in the state sensor 53 of the mobile terminal 50. According to this, it is easy to improve the accuracy of state determination.

During the operation authentication started in step S180, the same state determination as in step S120 may be performed. More specifically, state determination is made for each of the two types of authentication, i.e., connection authentication and operation authentication. Alternatively, state determination may be performed during operation authentication without performing state determination in connection authentication. In this case, it is possible to determine that the mobile termination is always in the moving state at the stage of connection authentication, and proceed to operation authentication.

The control unit 70 may stop waiting for the connection request signal transmitted from the vehicle 11 side before performing the state determination in step S120. In this case, when the elapsed time from detection of the connection request signal to the present time is equal to or longer than a predetermined waiting restart time, it is configured to restart the waiting of the connection request signal. According to this, it is possible to prevent frequent repetition of the control of disallowing the connection authentication for a short time because the permission condition is not satisfied. On the other hand, if the waiting for the connection request signal is not stopped and the waiting for the connection request signal is maintained, a configuration can be adopted in which authentication control can be performed with a plurality of vehicles 11 at the same time.

Second Embodiment

The present embodiment is a modification of the above-described embodiments. In this embodiment, it is determined whether or not batch processing can be executed in the mobile terminal 50, and if the batch processing can be executed, batch processing is executed. Also, it acquires user setting information and changes permission conditions used for authentication control according to the user setting information. Also, an activity time zone is set, and the movement acceleration used for state determination is changed between the activity time zone and the time zone other than the activity time zone.

Figure 7:
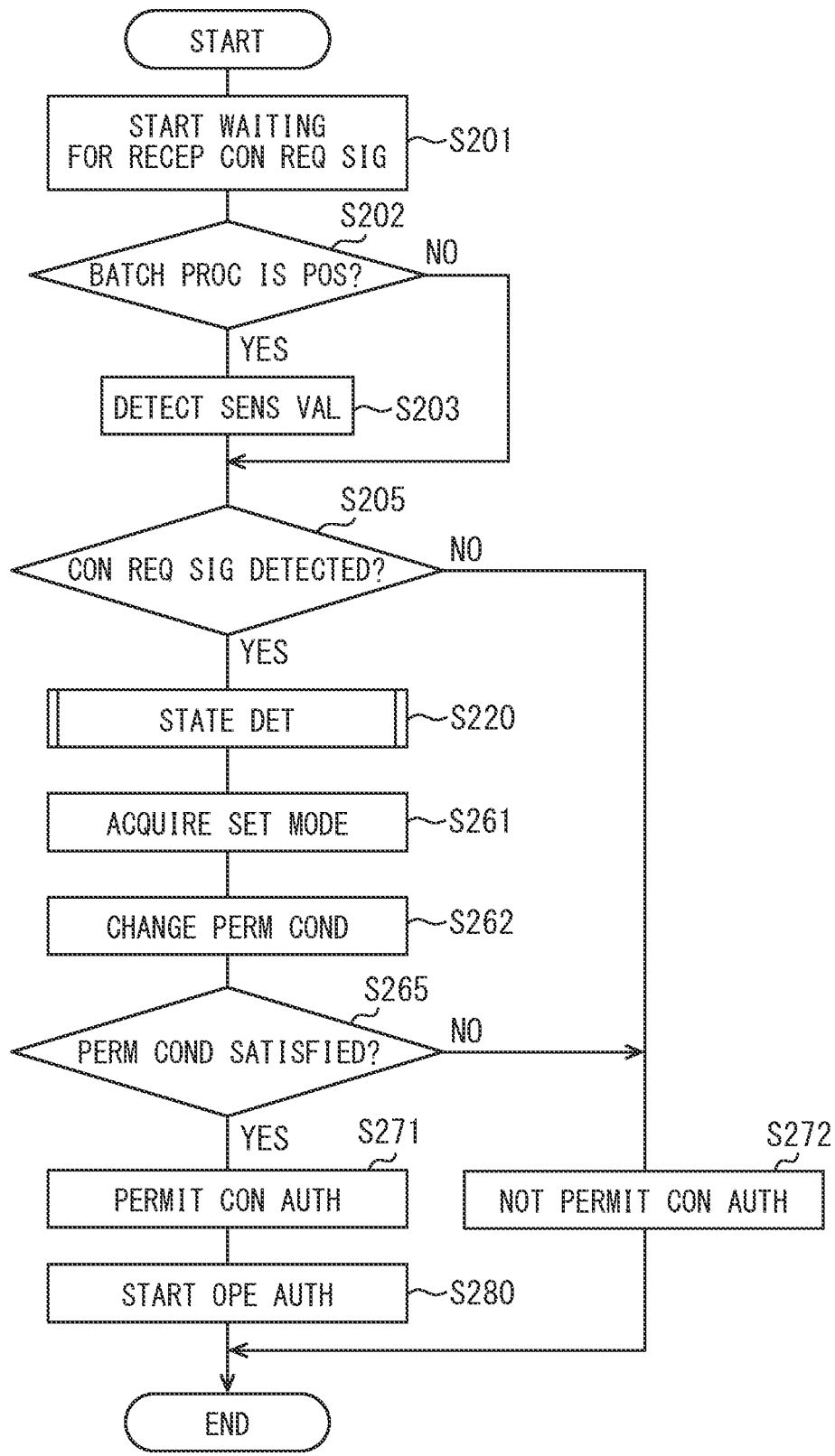
FIG. 7 is a flow chart regarding authentication control in the second embodiment.

Of the authentication control in the authentication system 1, a part particularly related to connection authentication will be described below. In FIG. 7, when the user activates the authentication application using the mobile terminal 50, authentication control is started. When authentication control is started, the control unit 70 starts waiting for a connection request signal in step S201, and proceeds to step S202.

In step S202, the determination unit 73 determines whether the batch process is executable in the mobile terminal 50. Here, the batch process is a processing method in which data to be acquired is stored in a buffer, a plurality of data are collectively acquired from the buffer, and information is processed. The batch process is also called a package process. Whether the batch process is executable can be determined by acquiring the buffer size in the mobile terminal 50. In this case, if the buffer size is zero, the model of the mobile terminal is not compatible with the batch process, and if the buffer size is greater than zero, the model is compatible with the batch process. Alternatively, it may be determined whether the batch process is executable by acquiring the model-dependent information of the mobile terminal 50.

Even if the model supports the batch process, the batch process may not function properly. Therefore, it may be preferable to determine whether the batch process functions normally. To determine whether the batch process works normally, it is determined whether or not two sensor value series obtained by different acquisition methods are approximately equal to each other by comparing the sensor value series acquired all the time with the sensor value series acquired by the batch process in the same time period. If the two sensor value series substantially match, it can be determined that the batch process functions normally. On the other hand, if the two sensor value series do not substantially match, it is determined that there is a possibility that the batch process does not function normally. It may be preferable to execute a determination as to whether the batch process is possible or not while the mobile terminal 50 is in a sleep mode. Further, the determination as to whether or not the mobile terminal 50 is of a model compatible with the batch process may be completed before starting a series of controls. In this case, in step S202, only determination is made as to whether or not the batch process functions normally. If the batch process is possible, the process proceeds to step S203. On the other hand, if the batch process is not possible, the process proceeds to step S205.

In step S203, the state sensor 53 starts detecting sensor values in order to acquire sensor values collectively processed in later processing. If the detection cycle is 100 milliseconds, sensor value detection is repeated every 100 milliseconds. The detection of the sensor value is continued periodically, and it proceed to step S205.

In step S205, the determination unit 73 determines whether the reception unit 51 r of the mobile terminal 50 has detected the connection request signal transmitted from the BLE communication device 35 of the vehicle 11. When the reception unit 51r detects the connection request signal, it determines that the portable terminal 50 is present at a position close to the vehicle 11, and the process proceeds to step S220. On the other hand, when the reception unit 51r does not detect the connection request signal, it is determined that the portable terminal 50 is located far from the vehicle 11, and the process proceeds to step S272. Step S205 provides an example of an acquisition step and an acquisition process.

Figure 8:
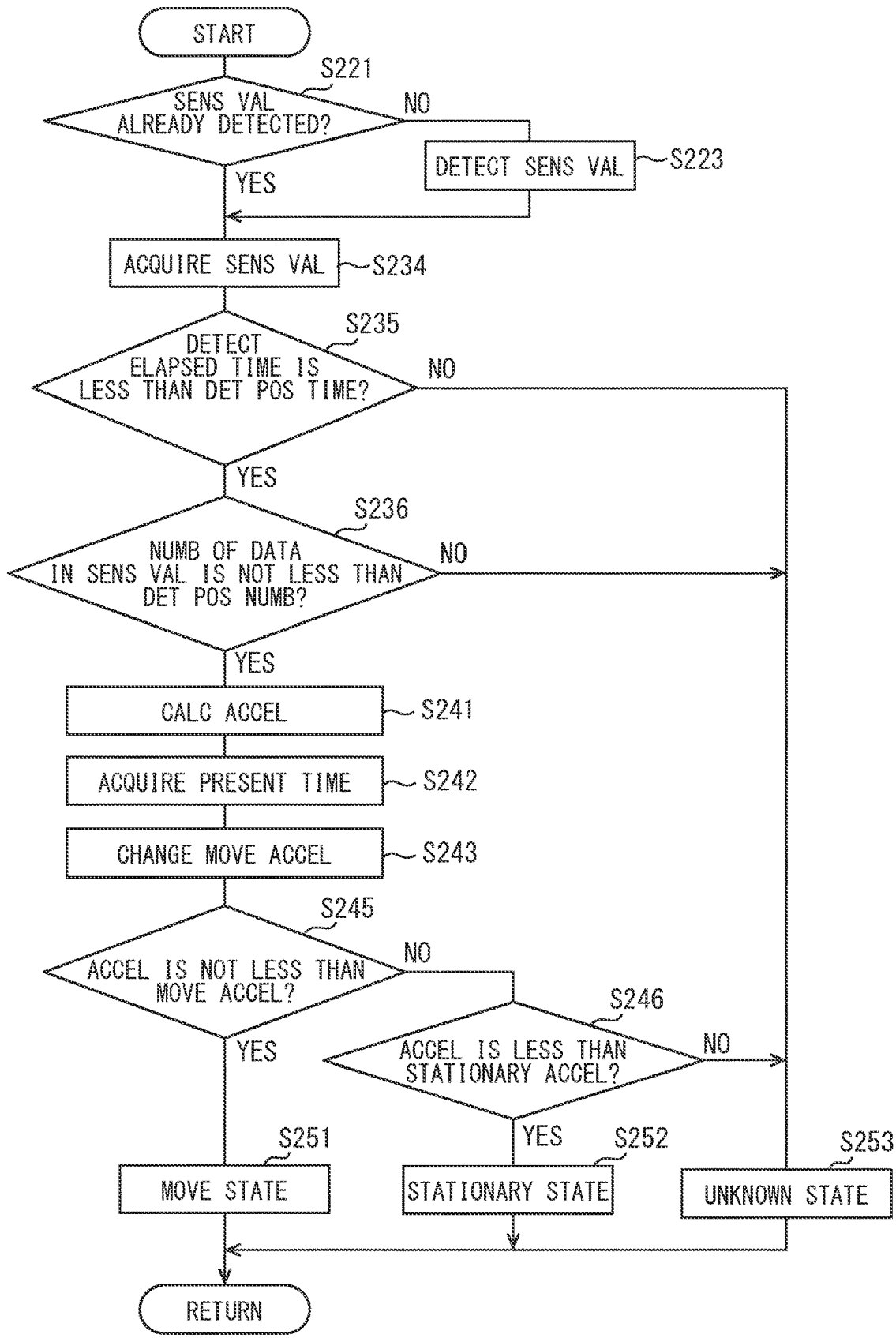
FIG. 8 is a flowchart showing a processes executed in S220 of FIG. 7.

In step S220, the control unit 70 executes a state determination. In FIG. 8, when the state determination is started, the determination unit 73 determines whether or not the sensor value has been detected in step S221. If the sensor value is stored in the buffer, it can be determined that the sensor value has been detected, and if the sensor value is not stored in the buffer, it can be determined that the sensor value has not been detected. If the sensor value has already been detected, the process proceeds to step S234. On the other hand, if the sensor value has not been detected, the process proceeds to step S223, and the state sensor 53 starts detecting the sensor value. After detecting the sensor value, the process proceeds to step S234. Step S220 provides an example of a determination step and determination process.

In step S234, the acquisition unit 71 acquires sensor values. If the batch process is possible, multiple sensor values are collectively acquired. For example, sensor values detected at ten different timings are collectively acquired. By collectively acquiring a plurality of sensor values, it is possible to complete acquisition of the sensor values in a shorter time than the time required to detect the multiple sensor values. On the other hand, if the batch process is not possible, a plurality of sensor values are obtained by repeatedly acquiring one sensor value each time one sensor value is detected. After acquiring the sensor value, the process proceeds to step S235. Step S234 provides an example of an acquisition step and an acquisition process.

In step S235, the determination unit 73 determines whether or not the detection elapsed time is less than the determination possible time. The detection elapsed time is the elapsed time from the time when the state sensor 53 detects the sensor value to the current time. If the mobile terminal 50 cannot detect sensor values in the sleep state, the old sensor values detected before the sleep state may be obtained. The purpose of executing this step S235 is to determine whether or not the state can be appropriately determined based on the sensor value reflecting the most recent state of the mobile terminal 50.

The determination possible time may be set to any time. By setting the determination possible time to be short, it becomes easier to prevent authentication by an unauthorized method by a third party, and it is easier to improve safety. On the other hand, by setting a longer determination possible time, authentication is more likely to be permitted, and user convenience is likely to be improved. In this way, it may be preferable to set the determination possible time in consideration of the two viewpoints of safety and convenience. The determination possible time is, for example, 2 seconds.

If the detection elapsed time is less than the determination possible time, it is determined that the acquired sensor value reflects the current state of the mobile terminal 50, and the process proceeds to step S236. On the other hand, if the detection elapsed time is equal to or longer than the determination possible time, it is determined that the acquired sensor value does not reflect the current state of the mobile terminal 50, and the process proceeds to step S253.

In step S236, the determination unit 73 determines whether or not the number of acquired sensor value data is equal to or greater than the determination possible number. When the number of acquired sensor value data is greater than or equal to the determination possible number, it is determined that appropriate state determination is possible, and the process proceeds to step S241. On the other hand, if the number of acquired sensor value data is less than the determination possible number, it is determined that appropriate state determination is impossible, and the process proceeds to step S253.

In step S241, the calculation unit 72 calculates an average acceleration, which is a value obtained by smoothing the acceleration from the sensor value. Here, the calculated average acceleration is set to the acceleration used for the state determination. After calculating the acceleration, the process proceeds to step S242.

In S242, the acquisition unit 71 acquires the current time. The current time can be obtained using timer 54. Here, the current time may be acquired through communication with the outside. After acquiring the current time, the process proceeds to S243.

At step S243, the control unit 70 changes the movement acceleration according to the current time. More specifically, it determines whether the current time is included in the activity time zone and changes the movement acceleration. Here, the activity time zone is a time zone during which the user is likely to perform activities involving movement of the mobile terminal 50. The activity time zone can be calculated by collecting usage statuses of the mobile terminal 50 in the server and performing statistical processing. Here, the method of setting the activity time period may not be limited to statistical processing. For example, the user may operate the mobile terminal 50 himself/herself to set the activity time period.

If the current time is included in the activity time zone, the movement acceleration is set to a small value, and if the current time is not included in the activity time zone, the movement acceleration is set to a large value. In other words, if the current time is included in the active time zone, the movement acceleration is changed so that the state of the mobile terminal 50 is likely to be determined to be in the moving state. On the other hand, if the current time is not included in the activity time zone, the movement acceleration is changed so that the state of the mobile terminal 50 is likely to be determined to be in the stationary state. Instead of setting an activity time zone, a non-active time zone, which is a time zone during which it is difficult for the user to perform activities involving movement of the mobile terminal 50, may be set. In this case, by changing the movement acceleration during the non-active time zone, it is possible to substantially change the movement acceleration during the active time zone. The non-active time zone includes the user's sleep time period and the like. After changing the movement acceleration, the process proceeds to step S245.

In step S245, the determination unit 73 determines whether the calculated acceleration is greater than or equal to the movement acceleration. When the acceleration is greater than or equal to the movement acceleration, the process proceeds to step S251. On the other hand, when the acceleration is less than the movement acceleration, the process proceeds to step S246.

In step S246, the determination unit 73 determines whether the calculated acceleration is less than the stationary acceleration. The stationary acceleration is set to a smaller value than the moving acceleration. If the acceleration is less than the stationary acceleration, the process proceeds to step S252. On the other hand, if the acceleration is greater than or equal to the stationary acceleration, the process proceeds to step S253. In other words, when the calculated acceleration is a value between the movement acceleration and the stationary acceleration, it is determined as an unknown state without being determined as a moving state or a stationary state.

In step S251, the determination unit 73 determines that the mobile terminal 50 is in the moving state. After determining that it is in the moving state, the process proceeds to step S261. In step S252, the determination unit 73 determines that the mobile terminal 50 is in the stationary state. After determining that it is in the stationary state, the process proceeds to step S261. In step S253, the determination unit 73 determines that the state of the mobile terminal 50 is not known. After determining that it is in the unknown state, the process proceeds to step S261.

In step S261 of FIG. 7, the acquisition unit 71 acquires the setting mode. The setting modes include a safety priority mode in which safety is prioritized over convenience and a convenience priority mode in which convenience is prioritized over safety. The setting mode can be set by the operation of the operation input unit 56 by the user. After acquiring the setting mode, the process proceeds to step S262.

At step S262, the execution unit 74 changes the permission condition according to the setting mode. More specifically, in the safety-priority mode, the permission condition does not include the unknown state, and in the convenience-priority mode, the permission condition includes the unknown state. As a result, in the safety priority mode, authentication is less likely to be permitted than in the convenience priority mode, making it easier to improve security safety. In other words, in the convenience-priority mode, authentication is more likely to be permitted than in the safety-priority mode, making it easier to improve convenience. After changing the permission conditions, the process proceeds to step S265.

In step S265, the determination unit 73 determines whether the state of the mobile terminal 50 satisfies the permission condition. When the permission condition is satisfied, the process proceeds to step S271. On the other hand, if the permission condition is not satisfied, the process proceeds to step S272.

In step S271, the execution unit 74 permits connection authentication. More specifically, a connection response signal is generated, and the connection response signal is transmitted from the transmission unit 51$s$ to the BLE communication device 35 to permit the connection authentication. After permitting the connection authentication, the process proceeds to step S280. Step S271 provides an example of an execution step and an execution process.

In step S280, the control unit 70 starts operation authentication. When the operation authentication is permitted, the user can operate the mobile terminal 50 to transmit various vehicle control requests and maintain a state in which the vehicle 11 can be controlled. After operation authentication, a series of authentication control ends.

In step S272, the execution unit 74 disallows connection authentication. More specifically, no connection response signal is generated, and no connection response signal is transmitted from the transmission unit 51$s$ to the BLE communication device 35. Since a connection response signal is not returned from the mobile terminal 50 in response to the connection request signal transmitted from the BLE communication device 35, a state in which connection authentication is not permitted is maintained. Since connection authentication is not permitted, operation authentication cannot proceed, and operation authentication is not permitted. The authentication control ends under a state where the connection authentication is not permitted. As a result, even when various vehicle control requests are transmitted, the vehicle 11 is maintained in a non-controllable state. Step S272 provides an example of an execution step and an execution process.

According to the above-described embodiment, the determination unit 73 determines that the state is unknown when the detection elapsed time, which is the elapsed time from the detection time when the information used for state determination is detected to the current time, is equal to or greater than the determination possible time. The determination unit 73 determines that the state is unknown when the number of pieces of information used for state determination is less than the determination possible number. Therefore, when it is difficult to accurately determine the state, the unknown state can be determined. Therefore, it is possible to prevent from being erroneously determined to be in the stationary state even though the position of the mobile terminal 50 has changed. In addition, it is possible to prevent from being erroneously determined to be in a moving state even though the position of the mobile terminal 50 has not changed.

The control unit 70 does not include the unknown state in the permission condition when the safety priority mode is set, and includes the unknown state in the permission condition when the convenience priority mode is set. Therefore, whether or not to permit authentication in the unknown state can be adjusted according to the user's preference. Therefore, the usability of the authentication system 1 can be adjusted according to the user's preference.

The movement acceleration when the current time is included in the activity time zone is smaller than the movement acceleration when the current time is not included in the activity time zone. In other words, when the current time is included in the activity time zone, the determining unit 73 is more likely to determine that the user is in the moving state than when the current time is not included in the activity time zone. Therefore, it is easy to improve the accuracy of state determination. In particular, it is easy to prevent a situation in which the state sensor 53 detects a minute vibration during a time period other than the activity time zone and permits authentication against the user's intention.

The acquisition unit 71 collectively acquires a plurality of pieces of information detected by state sensor 53 when the mobile terminal 50 is capable of collectively processing a plurality of pieces of information. Therefore, the required number of sensor values can be obtained in a short time. Therefore, it is possible to shorten the time required from detection of the connection request signal to permission or non-permission of connection authentication. Therefore, it is easy to provide the authentication system 1 with a short response time.

Other Embodiments

The disclosure in this specification and drawings is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure also includes replacement or combination of components and/or elements between one embodiment and another. The technical scope disclosed in the present disclosure is not limited to the above-described embodiments. It should be understood that some disclosed technical ranges are indicated by description of claims, and includes every modification within the equivalent meaning and the scope of description of claims.

The disclosure in the specification, drawings and the like is not limited by the description of the claims. The disclosures in the specification, the drawings, and the like includes the technical ideas described in the claims, and further extend to a wider variety of technical ideas than those described in the claims. Thus, various technical ideas can be extracted from the disclosure of the specification, the drawings and the like without being limited to the description of the present disclosure.

The control unit and method thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The technique for realizing the functions of each functional unit included in the apparatus or the method thereof does not necessarily need to include software, and all the functions may be realized using one or more hardware circuits. The computer program may be stored in a computer-readable non-transition tangible recording medium as an instruction executed by a computer.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

What is claimed is:

1. An authentication system for performing authentication control between a mobile terminal and an authentication target device including connection authentication for establishing a communication connection and operation authentication for operating the authentication target device to determine whether an operation by a user possessing the mobile terminal is permitted, the authentication system comprising:
   the mobile terminal, wherein:
   the mobile terminal is a smart phone for executing a short-range wireless communication;
   the mobile terminal includes:
   a state sensor that detects a state of the mobile terminal;
   a reception unit that receives a connection request signal for requesting a communication connection;
   a transmission unit that transmits a connection response signal transmitted in response to the connection request signal; and
   a control unit that controls the short-range wireless communication;
   the control unit includes:
   an acquisition unit that acquires information received by the reception unit and information detected by the state sensor;
   a determination unit that performs a state determination for determining the state of the mobile terminal based on the information acquired by the acquisition unit; and
   an execution unit that transmits the connection response signal from the transmission unit when the state of the mobile terminal satisfies a permission condition, and does not transmit the connection response signal when the state of the mobile terminal does not satisfy the permission condition;
   the determination unit does not perform the state determination before the reception unit receives the connection request signal, and performs the state determination after the reception unit receives the connection request signal;
   the reception unit receives the connection request signal even when the mobile terminal is in a sleep state;
   the acquisition unit does not acquire the information detected by the state sensor before the reception unit receives the connection request signal, and acquires the information detected by the state sensor after the reception unit receives the connection request signal;
   the determination unit determines whether a detection period for detecting the information by the state sensor is longer than a determination possible period after the reception unit receives the connection request signal;

when the detection period is longer than the determination possible period, the control unit changes the detection period to be equal to or less than the determination possible period.

2. The authentication system according to claim 1, wherein:
the determination unit determines that the mobile terminal is in a moving state when the mobile terminal is moving, and determines that the mobile terminal is in a stationary state when the mobile terminal remains stationary; and
the execution unit sets the permission condition that the mobile terminal is in the moving state.

3. The authentication system according to claim 2, wherein:
the determination unit determines that the mobile terminal is in an unknown state when a detection elapsed time, which is an elapsed time from a detection time of the information used for the state determination to a present time, is equal to or longer than a determination possible time, or when a numerical number of data of the information used for the state determination is less than a determination possible number.

4. The authentication system according to claim 3, further comprising:
an operation input unit that inputs a setting mode set by the user, wherein:
the execution unit sets the permission condition not including the unknown state when the setting mode is set to a mode that prioritizes safety over convenience, and sets the permission condition including the unknown state when the setting mode is set to a mode that prioritizes convenience over safety.

5. The authentication system according to claim 4, further comprising:
a timer that measures a present time, wherein:
the control unit sets an activity time zone, which is a time zone during which the user is likely to perform activities involving movement of the mobile terminal; and
the determination unit is more likely to determine that the mobile terminal is in the moving state when the present time is disposed in the activity time zone than when the present time is not disposed in the activity time zone.

6. The authentication system according to claim 1, wherein:
the acquisition unit collectively acquires a plurality of pieces of the information detected by the state sensor when the mobile terminal executes a batch process for collectively processing the plurality of pieces of the information.

7. The authentication system according to claim 1, wherein:
the mobile terminal is a smart phone capable of communication connection with a plurality of devices at a same time by short-range wireless communication.

8. The authentication system according to claim 1, further comprising:
one or more processors, wherein:
the one or more processors provides at least: the mobile terminal.

9. An authentication method for performing an authentication control between a mobile terminal and an authentication target device including a connection authentication for establishing a communication connection and an operation authentication for operating the authentication target device using the mobile terminal as a smart phone executable of a short-range wireless communication and a communication device that receives a signal transmitted from the mobile terminal toward the authentication target device as a target whether an operation by a user possessing the mobile terminal is permitted, the authentication method comprising:
acquiring information received by a reception unit disposed in the mobile terminal and information detected by a state sensor for detecting a state of the mobile terminal;
performing a state determination for determining the state of the mobile terminal based on the information acquired in the acquiring of the information; and
transmitting a connection response signal from a transmission unit disposed in the mobile terminal when the state of the mobile terminal satisfies a permission condition; and not transmitting the connection response signal from the transmission unit when the state of the mobile terminal does not satisfy the permission condition, wherein:
the performing of the state determination further includes: not performing the state determination before the reception unit receives a connection request signal, and performing the state determination after the reception unit receives the connection request signal;
the reception unit receives the connection request signal even when the mobile terminal is in a sleep state;
the acquiring of the information further includes: not acquiring the information detected by the state sensor before the reception unit receives the connection request signal; and acquiring the information detected by the state sensor after the reception unit receives the connection request signal; and
the performing of the state determination further includes: determining whether a detection period for detecting the information by the state sensor is longer than a determination possible period after the reception unit receives the connection request signal, the authentication method further comprising:
changing the detection period to be equal to or less than the determination possible period when the detection period is longer than the determination possible period.

10. A non-transitory computer readable storage medium comprising instructions being executed by a computer, the instructions including a computer-implemented method for performing an authentication control between a mobile terminal and an authentication target device including a connection authentication for establishing a communication connection and an operation authentication for operating the authentication target device using the mobile terminal as a smart phone executable of a short-range wireless communication and a communication device that receives a signal transmitted from the mobile terminal toward the authentication target device as a target whether an operation by a user possessing the mobile terminal is permitted, the instructions including:
acquiring information received by a reception unit disposed in the mobile terminal and information detected by a state sensor for detecting a state of the mobile terminal;
performing a state determination for determining a state of the mobile terminal based on the information acquired in the acquiring of the information; and
transmitting a connection response signal from a transmission unit disposed in the mobile terminal when the state of the mobile terminal satisfies a permission condition, and not transmitting the connection response signal from the transmission unit when the state of the mobile terminal does not satisfy the permission condition, wherein:

the performing of the state determination further includes: not performing the state determination before the reception unit receives a connection request signal, and performing the state determination after the reception unit receives the connection request signal;

the reception unit receives the connection request signal even when the mobile terminal is in a sleep state;

the acquiring of the information further includes: not acquiring the information detected by the state sensor before the reception unit receives the connection request signal; and acquiring the information detected by the state sensor after the reception unit receives the connection request signal; and the performing of the state determination further includes: determining whether a detection period for detecting the information by the state sensor is longer than a determination possible period after the reception unit receives the connection request signal, the instructions further including:

changing the detection period to be equal to or less than the determination possible period when the detection period is longer than the determination possible period.

* * * * *